United States Patent
Motozawa et al.

(10) Patent No.: US 6,186,574 B1
(45) Date of Patent: Feb. 13, 2001

(54) VEHICLE OCCUPANT PROTECTION SYSTEM

(75) Inventors: Yasuki Motozawa; Takahiro Kamei; Makoto Tsuruta, all of Wako (JP)

(73) Assignee: Honda Giken Kogyo Kabushiki Kaisha, Tokoyo (JP)

(*) Notice: Under 35 U.S.C. 154(b), the term of this patent shall be extended for 0 days.

(21) Appl. No.: 09/377,366

(22) Filed: Aug. 18, 1999

(30) Foreign Application Priority Data

Aug. 20, 1998 (JP) .................................................. 10-233749

(51) Int. Cl.$^7$ ....................................................... B60N 2/02
(52) U.S. Cl. ................. 296/68.1; 297/216.1; 297/216.16; 297/216.18
(58) Field of Search .................................. 296/68.1, 188, 296/189; 297/216.1, 216.16, 216.18

(56) References Cited

U.S. PATENT DOCUMENTS

| | | | |
|---|---|---|---|
| 3,732,944 | * 5/1973 | Kendall | 297/216.1 |
| 3,992,046 | * 11/1976 | Morse | 297/216.1 |
| 4,156,472 | * 5/1979 | Bryll | 297/216.1 |
| 4,832,409 | * 5/1989 | Borlinghaus et al. | 297/216.1 |
| 4,881,781 | * 11/1989 | Borlinghaus et al. | 297/216.1 |
| 5,167,421 | * 12/1992 | Yunzhao | 297/216.1 |
| 5,286,085 | * 2/1994 | Minami | 297/216.6 |
| 5,437,494 | * 8/1995 | Beauvais | 297/216.1 |
| 5,626,203 | * 5/1997 | Habib | 297/216.18 |
| 5,681,057 | * 10/1997 | Whirley et al. | 296/188 |
| 5,685,603 | * 11/1997 | Lane | 297/216.1 |
| 5,746,467 | * 5/1998 | Jesadanont | 296/68.1 |
| 5,810,417 | * 9/1998 | Jesadanont | 296/68.1 |
| 6,003,937 | * 12/1999 | Dutton et al. | 297/216.1 |
| 6,116,561 | * 9/2000 | Christopher | 297/216.1 |

FOREIGN PATENT DOCUMENTS 7-101354   4/1995 (JP) .

OTHER PUBLICATIONS

Patent Abstracts of Japan, 07101354, Apr. 18, 1995, http://www2.ipdljpo-miti.go.jp/dbpweb/connecter/guest/DB-Pquery/ENGDB/wdispaj.

* cited by examiner

Primary Examiner—Joseph D. Pape
Assistant Examiner—Kiran Patel
(74) Attorney, Agent, or Firm—Skjerven Morrill MacPherson LLP; Alan H. MacPherson

(57) ABSTRACT

The vehicle occupant protection system can significantly reduce the peak deceleration of the vehicle occupant even with a small vehicle body. The system comprises a seat supported on a vehicle body so as to be slidable in a direction of an input crash load resulting from a vehicle crash; a first member connected to the seat and adapted to deform under the crash load upon occurrence of a vehicle crash; a second member connected to a main part of the vehicle body and adapted to deform under the crash load; and a stopper or an actuator for applying a forward force to the seat relative to the vehicle body with a certain time delay after the occurrence of the vehicle crash; the first member being adapted to substantially deform only after the forward force is applied to the seat upon occurrence of a vehicle crash. Thus, in case of a vehicle crash or other high deceleration situations, the seat is accelerated rearward upon the occurrence of a vehicle crash by the first member resisting deformation while the second member deforms so that the restraining capability of the seat belt is enhanced. Thereafter, an acceleration in the opposite direction is applied to the seat by the application of the forward force to the seat relative to the vehicle body so that the equalization of the decelerations of the vehicle body and the vehicle occupant is achieved in an early stage of the crash.

4 Claims, 3 Drawing Sheets

VEHICLE OCCUPANT PROTECTION SYSTEM

TECHNICAL FIELD

The present invention relates to a vehicle occupant protection system, and in particular to a vehicle occupant protection system which can reduce a deceleration acting upon a vehicle occupant at the time of a vehicle crash.

BACKGROUND OF THE INVENTION

In recent years, various proposals have been made in regard to automotive vehicle body structures to maximize the protection of vehicle occupants at the time of a vehicle crash. For instance, proposals have been made to minimize the deceleration of the part of the vehicle body occupied by vehicle occupants by properly selecting the deformation of the remaining part of the vehicle body, and preventing the former part of the vehicle body from deforming (see Japanese patent laid open publication No. 7-101354, for instance).

When a vehicle occupant is restrained to the seat by a seat belt, the forward inertial force acting upon the vehicle occupant at the time of a vehicle crash starts rising only after the vehicle occupant is fully restrained by the seat belt. Because the seat belt inevitably has a certain resiliency, the deceleration acting on the vehicle occupant reaches a maximum level when the vehicle occupant is thrown forward, and the maximum elongation of the seat belt has occurred. The maximum level is higher as the forward movement of the vehicle occupant under the inertial force increases, and is known to substantially exceed the average deceleration of the vehicle body. Therefore, to minimize the impact which the vehicle occupant receives at the time of a vehicle crash, it is necessary to minimize the time delay in the rise in the deceleration of the vehicle occupant with respect to the deceleration of the vehicle body.

However, it is generally impossible to integrally attach a vehicle occupant to a vehicle body, and is therefore difficult to reduce the deceleration of the vehicle occupant in the case of small passenger cars which do not provide adequate deformation strokes of the parts of the vehicle body other than the part occupied by the vehicle occupant only with conventional approaches which essentially consist of attempts to reduce the deceleration of the passenger compartment by controlling the deformation mode of the vehicle body.

BRIEF SUMMARY OF THE INVENTION

In view of such problems of the prior art, a primary object of the present invention is to provide a vehicle occupant protection system which allows the peak deceleration acting upon a vehicle occupant at the time of a vehicle crash to be minimized for a given deformation stroke of the vehicle body.

A second object of the present invention is to provide a vehicle occupant protection system which allows the deceleration acting upon the vehicle occupant at the time of a vehicle crash to be spread over time so as to minimize the peak deceleration acting upon the vehicle occupant.

A third object of the present invention is to provide a vehicle occupant protection system which allows the peak deceleration acting upon the vehicle occupant to be minimized even though the size of the vehicle body is limited.

A fourth object of the present invention is to provide a vehicle occupant protection system which is simple in structure, and may consist of strictly passive elements.

According to the present invention, these and other objects can be accomplished by providing a vehicle occupant protection system, comprising: a seat which is fitted with a seat belt, and supported on a vehicle body so as to be slidable in a direction of an input crash load resulting from a vehicle crash; a first member which is connected to the seat and adapted to deform under the crash load while supporting an inertial force of the seat upon occurrence of a vehicle crash; a second member which is connected to a main part of the vehicle body and adapted to deform under the crash load while supporting an inertial force of the vehicle body; and means for applying a forward force to the seat relative to the vehicle body with a certain time delay after the occurrence of the vehicle crash; the first member being adapted to substantially deform only after the forward force is applied to the seat upon occurrence of a vehicle crash.

Because the second member deforms upon the occurrence of a vehicle crash while the first member resists deformation during an early phase of the crash, the restraining capability of the seat belt is enhanced by applying to the seat a deceleration higher than the vehicle body deceleration during the early phase of the vehicle crash. Thereafter, a force opposite in direction to the crash load is applied to the seat so that the forward inertial force acting on the vehicle occupant is canceled, and the equalization of the decelerations of the vehicle body and the vehicle occupant is achieved in an early stage of the crash.

In a preferred embodiment only consisting of passive elements, the forward force applying means comprises a stopper provided in the vehicle body, and adapted to abut the seat when the second member has deformed by a prescribed stroke. Alternatively, the forward force applying means comprises an actuator which, for instance, may be activated by a signal from a deceleration sensor. The seat is typically fixedly mounted on a moveable floor which is connected to the first member. The first member may comprise a side beam, and the second member may comprise a main frame.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
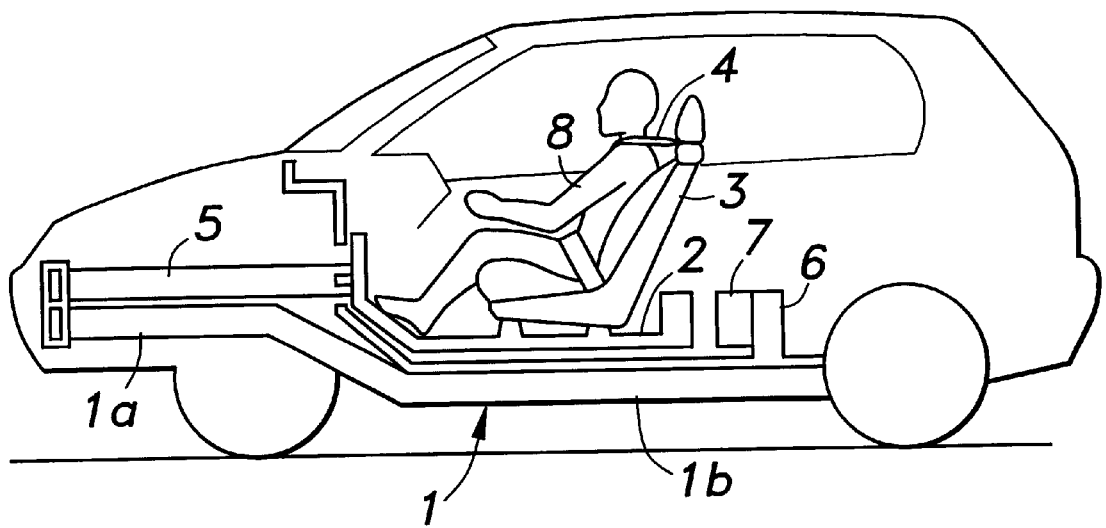
FIG. 1 is a schematic view of a vehicle body embodying the present invention.

FIG. 1 schematically illustrates a vehicle body structure embodying the present invention. This vehicle body structure is divided into a main frame 1 extending in the fore-and-aft direction of the vehicle body, and a moveable floor 2 which is attached to the main frame 1 so as to be moveable in the rearward direction from an initial position over a certain stroke. In this embodiment, the seat 3 and the seat belt 4 are fixed to the moveable floor 2.

The front end of each side portion of the moveable floor 2 is connected a side beam 5 which extends toward the front end of the vehicle body. In this embodiment, the front portion 1a of the main frame 1 also extends toward the front end of the vehicle body in parallel with the side beam 5.

A part of the vehicle body opposing the rear end of the moveable floor 2 is provided with a stopper 6 for limiting the rearward movement of the moveable floor 2. The stopper 6 is provided with a buffering force generating means 7 which for instance may consist of a honeycomb structure.

The front portion 1a of the main frame 1 and the side beam 5 of the moveable floor 2 both undergo a compressive deformation under the crash load at the time of a vehicle crash, and thereby perform the function of reducing the deceleration acting on the passenger compartment of the vehicle.

Figure 2A:
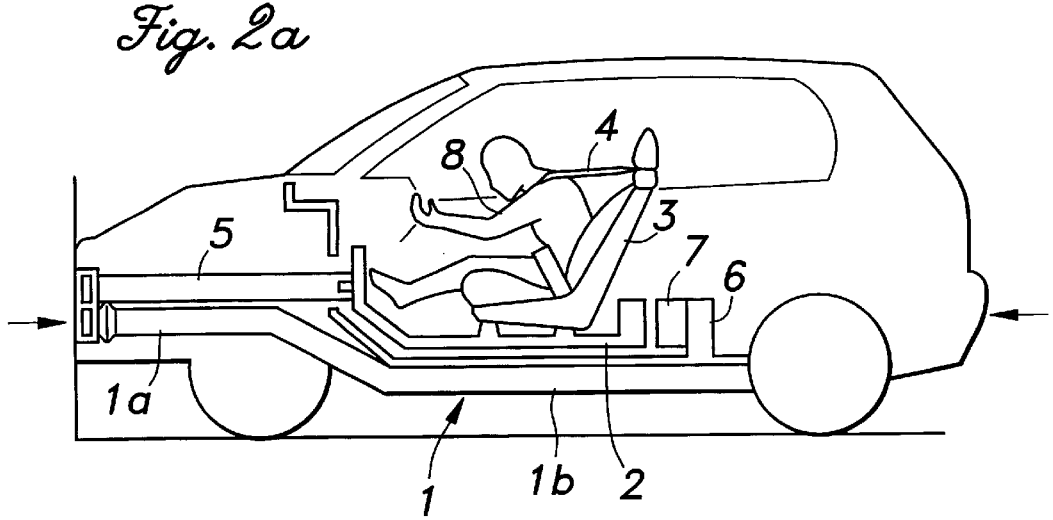
FIGS. 2a to 2c are diagrammatic sectional side views showing the process of a vehicle crash.

Now the mode of operation of the system of the present invention is described in the following with respect to a case of a frontal crash onto a fixed structure on the road with reference to FIGS. 2 and 3.

The deformation of the vehicle body starts from the deformation of the front portion 1a of the main frame 1 and the side beam 5 of the moveable floor 2 at the moment of a vehicle crash. Because the mass of the moveable floor 2 is substantially small as compared with the deformation stress that is produced in the side beam 5, the moveable floor 2 starts decelerating earlier at a deceleration level which builds up more rapidly and sharply (interval a of FIG. 3) than the main frame 1. Thus, the moveable floor 2 apparently moves rearward or in the opposite direction of motion at the time of the vehicle crash relative to the passenger compartment 1b of the main frame 1 which continues to move forward due to the compressive deformation of the front portion 1a thereof (FIG. 2a).

Under this condition, the vehicle occupant 8 moves forward under the inertial force, but because the seat 3 which is integral with the moveable floor 2 instantly moves rearward with respect to the passenger compartment 1b of the main frame 1, the restraining force of the seat belt 4 on the vehicle occupant 8 increases, and the forward movement of the vehicle occupant 8 is restrained.

Figure 2B:
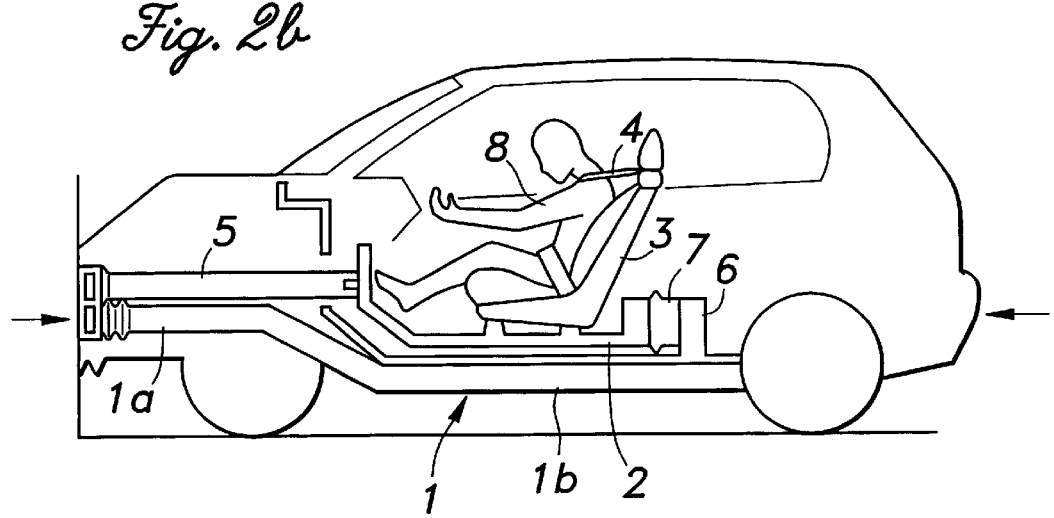
Figure 3:
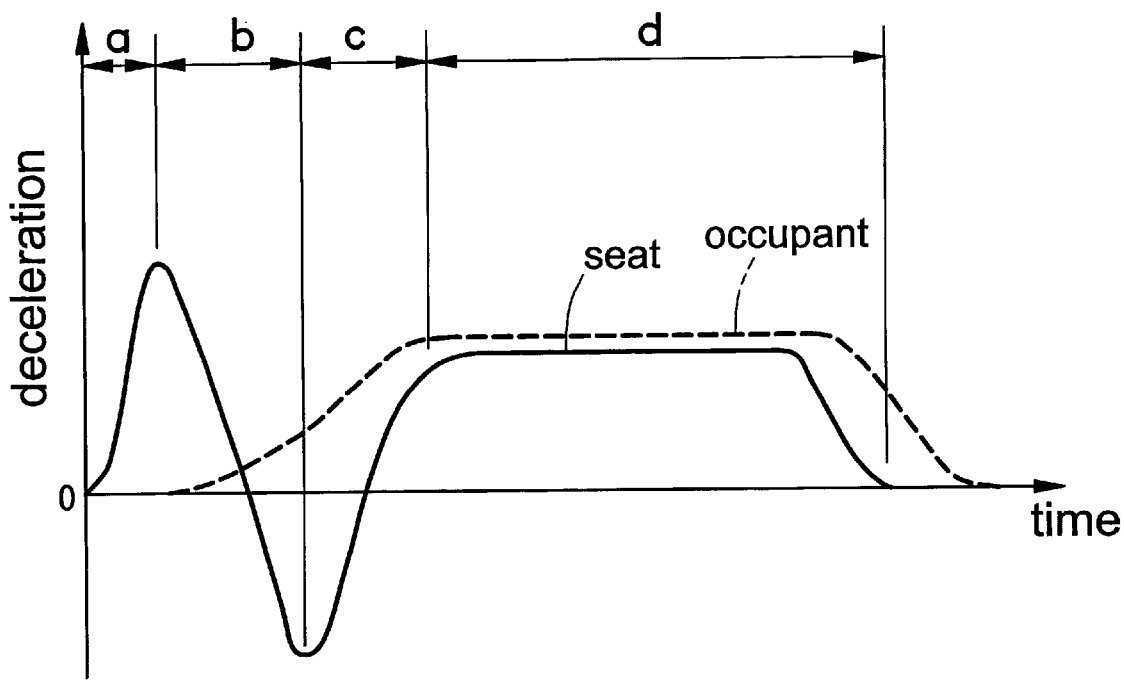
FIG. 3 is a graph showing the time histories of deceleration at the time of the vehicle crash.

During an intermediate phase of the crash, the rear end of the moveable floor 2, which has been subjected to a large deceleration due to the resistance of the side beam 5 against deformation, strikes upon the stopper 6 of the main frame 1 which continues to move forward due to the compressive deformation of the front portion 1a thereof (FIG. 2b). As a result, the inertial force of the passenger compartment 1b of the main frame 1 is transmitted to the moveable floor 2 so that the moveable floor 2 continues to move relative to the main frame 1 until the deformation of the buffering force generating means 7 of the stopper 6 is completed, and the relative speed between the main frame 1 and the moveable floor 2 is thereby reduced to zero. Thus, the forward acceleration at the time of the vehicle crash is transmitted to the moveable floor 2, and cancels the forward inertial force acting on the vehicle occupant 8 (interval b of FIG. 3).

Figure 2C:
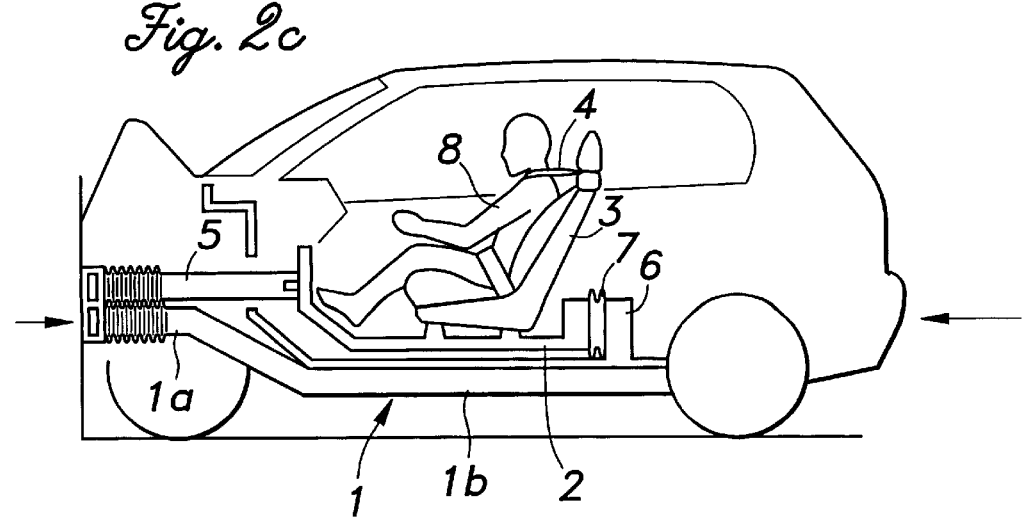

During the final phase of the crash, the deceleration level sharply rises when the deformation stress of the side beam 5 is added to the deformation stress of the front portion 1a of the main frame 1 (interval c of FIG. 3), and the passenger compartment 1b of the main frame 1 and the moveable frame 2 jointly decelerate (FIG. 2c). Then, the relative speed between the passenger compartment 1b of the main frame 1 and the moveable frame 2 is reduced to zero as a result of the above described process, and the restraining load of the seat belt 4 balances out with the deceleration level of the vehicle occupant 8 during the final phase of the crash so that the passenger compartment 1b of the main frame 1 and the moveable frame 2 jointly decelerate, and this state is maintained until the vehicle body comes to a complete stop (interval d of FIG. 3).

It is an important factor to minimize the vehicle occupant deceleration in view of reducing the impact which is sustained by the vehicle occupant 8 at the time of a vehicle crash. However, the vehicle occupant deceleration can be reduced from the level of the prior art if the time history of deceleration is effected (as indicated by the solid lines in FIG. 3) in such a manner that a deceleration which is higher than the average vehicle body deceleration is applied to the seat 3 for a short period of time during an early phase of a vehicle crash, and following a short interval of applying a reverse deceleration to the seat 3, a same deceleration as the average vehicle body deceleration is applied to the seat 3. Thus, for a given deformation stroke of the vehicle body, the vehicle occupant deceleration can be reduced from that of a vehicle not equipped with the system of the present invention as indicated by the broken lines in FIG. 3.

To enhance the effect of the present invention which was described above, it is preferable to suitably select the mechanical strengths of the front portion 1a of the main frame 1 and the side beam 5, the resilient property of the seat belt 4, the mechanical strength of the stopper 6 and the displacement of the moveable floor 2 so as to bring the relative speed between the vehicle occupant 8 and the passenger compartment 1b of the main frame 1 as close to zero as possible, and to balance out the restraining load of the seat belt 4 with the deceleration of the front portion 1a of the main frame 1 and the moveable floor 2 during the final phase of the crash.

Figure 4:
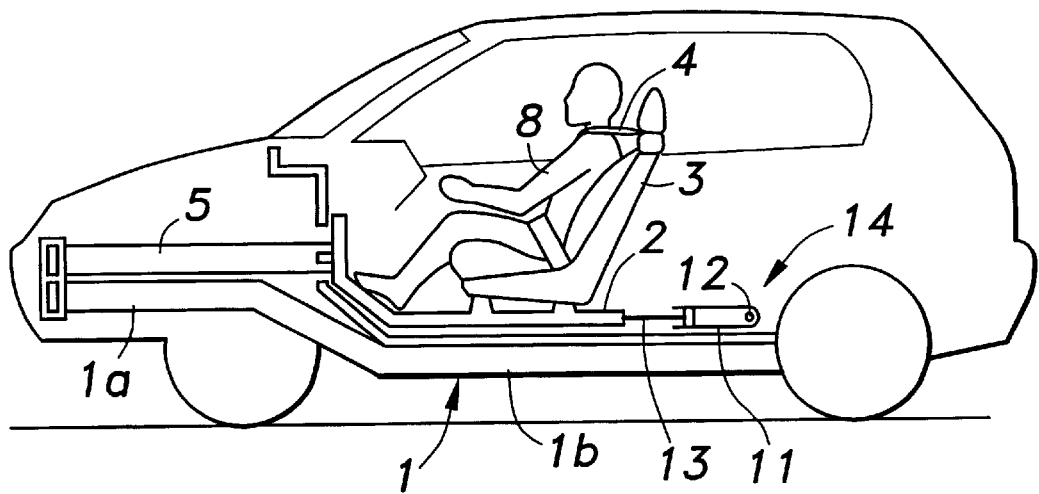
FIG. 4 is a schematic sectional side view of a vehicle body given as another embodiment of the present invention.

Instead of the stopper 6 described above, it is also possible to provide an actuator 14 which includes a cylinder 11 fixedly attached to the main frame 1 and a piston rod 13 connected to the moveable floor 2 as shown in FIG. 4, the piston rod 13 being adapted to be pushed out by high pressure gas produced from a gas generator 12 installed in the cylinder bottom. The gas generator 12 is ignited according to the deceleration of the moveable floor 2 or the rearward displacement thereof, and pushes back the moveable floor 2 in the forward direction.

Thus, according to the present invention, a deceleration higher than the vehicle body deceleration is applied only to the seat during an early phase of a vehicle crash, and a force opposite in direction to the crash load is applied only to the side of the seat after a certain time delay. Therefore, a desired time history of deceleration is applied to the seat in such a manner that the inertial force of the vehicle occupant which tends to throw him forward is canceled and, thereafter, the decelerations of the vehicle body, the seat and the vehicle occupant are equalized. The peak of the vehicle occupant deceleration for a given deformation stroke is substantially reduced as compared to the prior art. Furthermore, because the displacement of the vehicle occupant inside the passenger compartment can be minimized, the risk of the vehicle occupant sustaining an injury from a secondary impact upon a fixed structure of the passenger compartment can be reduced.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle occupant protection system, comprising:
    a seat which is fitted with a seat belt, and supported on a vehicle body so as to be slidable in a direction of an input crash load resulting from a vehicle crash;

a first member which is connected to said seat and adapted to deform under the crash load while supporting an inertial force of said seat upon occurrence of the vehicle crash;

a second member which is connected to a main part of the vehicle body and adapted to deform under the crash load while supporting an inertial force of the vehicle body; and means for applying a forward force to said seat relative to said vehicle body with a certain time delay after the occurrence of the vehicle crash;

the first member being adapted to substantially deform only after said forward force is applied to said seat upon occurrence of the vehicle crash.

2. A vehicle occupant protection system according to claim 1, wherein said forward force applying means comprises a stopper provided in said vehicle body, and adapted to abut the seat when said second member has deformed by a prescribed stroke.

3. A vehicle occupant protection system according to claim 1, wherein said seat is fixedly mounted on a moveable floor which is connected to said first member.

4. A vehicle occupant protection system according to claim 1, wherein said first member comprises a side beam, and said second member comprises a main frame.

* * * * *